(12) United States Patent
Somarowthu et al.

(10) Patent No.: US 12,469,118 B2
(45) Date of Patent: Nov. 11, 2025

(54) SYSTEM AND METHOD FOR MEASURING LEAF-TO-STEM RATIO

(71) Applicant: Deere & Company, Moline, IL (US)

(72) Inventors: Mahesh Somarowthu, Pune (IN); Sameer Gorivale, Pune (IN); Mohan A. Vadnere, Pune (IN)

(73) Assignee: Deere & Company, Moline, IL (US)

( * ) Notice: Subject to any disclaimer, the term of this patent is extended or adjusted under 35 U.S.C. 154(b) by 381 days.

(21) Appl. No.: 17/861,557

(22) Filed: Jul. 11, 2022

(65) Prior Publication Data

US 2024/0013363 A1    Jan. 11, 2024

(51) Int. Cl.
*G06T 7/00* (2017.01)
*G06T 7/11* (2017.01)
*G06T 7/62* (2017.01)

(52) U.S. Cl.
CPC .............. *G06T 7/0002* (2013.01); *G06T 7/11* (2017.01); *G06T 7/62* (2017.01); *G06T 2207/10024* (2013.01); *G06T 2207/20081* (2013.01); *G06T 2207/30188* (2013.01)

(58) Field of Classification Search
CPC ....... G06T 7/0002; G06T 7/0012; G06T 7/11; G06T 7/62; G06T 2207/10024; G06T 2207/20081; G06T 2207/30188
See application file for complete search history.

(56) References Cited

U.S. PATENT DOCUMENTS

| | | | |
|---|---|---|---|
| 9,527,115 B2 * | 12/2016 | LaRose | B07C 5/342 |
| 9,632,070 B2 * | 4/2017 | Roberts | G01N 33/02 |
| 10,251,340 B2 * | 4/2019 | Roberts | A01D 41/127 |
| 2015/0262351 A1 * | 9/2015 | Dima | A01D 41/1278 382/110 |
| 2019/0278988 A1 * | 9/2019 | Papanikolopoulos | G06V 20/17 |
| 2021/0149406 A1 * | 5/2021 | Javault | A01C 21/005 |
| 2022/0061221 A1 * | 3/2022 | Good | A01D 89/006 |
| 2022/0063617 A1 * | 3/2022 | Good | A01F 15/08 |
| 2022/0183208 A1 * | 6/2022 | Sibley | G06V 20/56 |
| 2022/0189053 A1 * | 6/2022 | Yao | A01B 79/005 |
| 2022/0226871 A1 * | 7/2022 | Kraus | A01D 82/00 |
| 2023/0292647 A1 * | 9/2023 | Bainbridge | G06V 20/188 702/2 |

(Continued)

FOREIGN PATENT DOCUMENTS

| | | | | |
|---|---|---|---|---|
| DK | 179768 B | * | 5/2019 | ............. A01D 82/00 |
| EP | 3167698 A1 | | 5/2017 | |

OTHER PUBLICATIONS https://www.mar.aegean.gr/sonarlab/photoquad/features/rnd/rnd.html, photoQuad website, (Year: 2016).*

(Continued)

*Primary Examiner* — Chan S Park
*Assistant Examiner* — Paulo Andres Garcia
(74) *Attorney, Agent, or Firm* — Tucker Ellis LLP; Evan T. Perry (57) ABSTRACT

Systems and methods are provided for determining a leaf-to-stem ratio of a crop automatically from an image of the crop. An agricultural vehicle may include a crop analysis system having a computing device and an imaging device for capturing an image of a crop. The computing device analyzes images acquired by the imaging determine to determine a leaf-to-stem ratio of the crop.

14 Claims, 7 Drawing Sheets
(2 of 7 Drawing Sheet(s) Filed in Color)

(56) References Cited

U.S. PATENT DOCUMENTS

2024/0161325 A1* 5/2024 Verstraete ............ G06V 20/188

OTHER PUBLICATIONS

V. Trygonis, M. Sini, photoQuad: A dedicated seabed image processing software, and a comparative error analysis of four photoquadrat methods, Journal of Experimental Marine Biology and Ecology, vols. 424â425, 2012, pp. 99-108, ISSN 0022-0981, https://doi.org/10.1016/j.jembe.2012.04.018. (Year: 2012).*

J. Weyler, A. Milioto, T. Falck, J. Behley and C. Stachniss, "Joint Plant Instance Detection and Leaf Count Estimation for In-Field Plant Phenotyping," in IEEE Robotics and Automation Letters, vol. 6, No. 2, pp. 3599-3606, Apr. 2021, doi: 10.1109/LRA.2021.3060712. (Year: 2021).*

Weaver, W. N., J. Ng, and R. G. Laport. 2020. LeafMachine: Using machine learning to automate leaf trait extraction from digitized herbarium specimens. Applications in Plant Sciences 8(6): e11367. (Year: 2020).* https://www.alforexseeds.com/alfalfa-leaf-to-stem-ratio/ Article on leaf-to-stem ratio for alfalfa maturity and quality of forage (Year: 2021).*

* cited by examiner

Leaf area (L)    Stem area (S)

FIG. 7

SYSTEM AND METHOD FOR MEASURING LEAF-TO-STEM RATIO

BACKGROUND

Typically, in a crop, leaves produce energy via photosynthesis and stem portions may consume energy through respiration. Thus, a leaf-to-stem ratio measurement of a crop can be indicative of a level of available for growth compared to an amount of energy available to feed soil microorganisms (via root exudates for example). The soil microorganisms can return nutrient to the soil for the crop.

In agricultural contexts, leaf-to-stem ratio can be indicative of other properties of a crop. For example, a nutritional value of the crop can be estimated based on the leaf-to-stem ratio. Further, a suitable dry down period can be predicted based on the leaf-to-stem ratio.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a crop analysis system is provided. The crop analysis system includes an imaging device configured to acquire an image of a crop. The crop analysis system also includes a computing device having a processor executing computer-readable instructions to generate a first metric associated with an amount of leaf in the image of the crop; generate a second metric associated with an amount of stem in the image of the crop; and determine a leaf-to-stem ratio for the crop based on the first and second metric.

In another implementation, a crop analysis method is provided. acquiring an image of a crop with an imaging device. The method also includes segmenting leaves and stems of the crop in the image. In addition, the method includes generating a first metric associated with an amount of leaf in the image of the crop and generating a second metric associated with an amount of stem in the image of the crop. Further, the method includes determining a leaf-to-stem ratio for the crop based on the first and second metric.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference to the accompanying drawings, which are incorporated in and constitute a part of the specification. The patent or application file contains at least one drawing executed in color. Copies of this patent or patent application publication with color drawing(s) will be provided by the Office upon request and payment of the necessary fee.

DETAILED DESCRIPTION

As described above, a leaf-to-stem ratio of a crop is useful to predict a nutritional value of the crop or to determine a suitable dry down time for the crop. For instance, leaves have higher digestibility than stem. In some estimations, 60 to 70 percent of leaves are digestible compared with 30 to 40 percent of stems. If the crop is fed to livestock, better nutrition is imparted when more leaves are consumed. More particularly, whole top growth may be fed to the livestock, and the nutrient content and digestibility of its two components, e.g. leaves and stems, figures greatly in the crop's feeding value at harvest. Any reduction in forage quality, separate from harvest related losses, may be attributed to two factors that are related to plant maturity at harvest. The first factor is a variation in the leaf-to-stem ratio and a second factor is the increasing lignification of stem tissue during plant maturation.

During harvesting, the crop is cut and laid on the ground, possibly in windrows, for drying. This period is dry down and may last a few days depending on the crop and climate conditions. After dry down, a baler, for example, may pick up the crop and bundle the crop into one or more bales. The dry down period, like the nutritional value, is affected by the leaf-to-stem ratio.

Conventionally, leaf-to-stem ratio is measured manually. For instance, a crop is picked-up and weighed. Then, leaves are removed from the crop and the remaining stems are weighed. Based on the two weight measurements, a leaf weight and, accordingly, a leaf-to-stem ratio is determined.

Automated techniques to determine leaf-to-stem ratio are described herein. These techniques enable the leaf-to-stem ratio to be determined on-the-go, for example on an agricultural vehicle. For instance, during harvesting (e.g. cutting), the leaf-to-stem ratio can be measured. The measurements, which are indicative of nutritional value, can be utilized to mark or label subsequent bales according to nutritional quality. In addition, the measurements can facilitate determination of a suitable dry down period prior to baling.

According to an aspect, image data or sensor data (e.g. spectroscopic data) of a crop can be acquired. The data may be acquired by devices mounted to an agricultural vehicle in some examples. The image and/or sensor data can be processed, detection techniques can be performed, and a leaf-to-stem ratio can be determined based on the detection techniques.

The system described herein provides an automated estimate of leaf-to-stem ratio in harvested crop by using image processing technique. The leaf-to-stem ratio may be utilized for bale quality determination and/or to calculate nutritional value of the crop. In one example, system can provide automated determination of leaf-to-stem ratio on an agricultural machine (e.g. a baler, a windrower, a harvester, etc.). In another example, the system can be provided on a computing device separate from an agricultural machine or vehicle.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
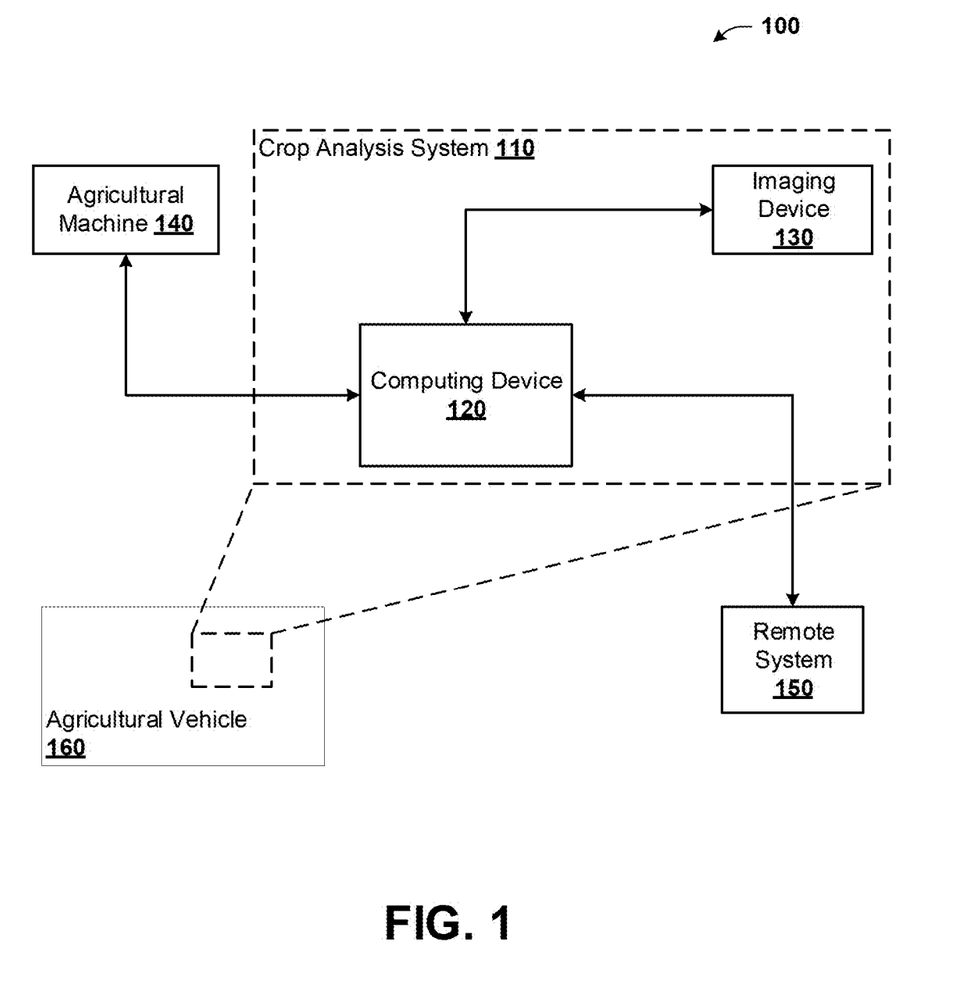
FIG. 1 illustrates an exemplary, non-limiting embodiment of a system for measuring a leaf-to-stem ratio of a crop according to various aspects.

Referring initially to FIG. 1, an agricultural system 100 for measuring a leaf-to-stem ratio of a crop is depicted. In one example, the system 100 may be, partially or entirely, included in or utilized by an agricultural vehicle 160, such as a tractor, a harvester, etc. As shown in FIG. 1, the system 100 includes a crop analysis system 110 and, in some embodiments, may additionally include an agricultural machine 140 and a remote system 150. The crop analysis system 110 includes an imaging device 130 and a computing device 120. It is to be appreciated that the crop analysis system 110, in one example, is capable of determining a leaf-to-stem ratio of a crop based on data acquired by the imaging device 130. The crop analysis system 110, in one example, may determine the leaf-to-stem ratio on-board the agricultural vehicle 160 and communicate the result to other devices such as remote system 150 and/or agricultural machine 140 (e.g. baler, etc.). In another example, the crop analysis system 110 may jointly determine the leaf-to-stem ratio with assistance from the remote system 150. For instance, data acquisition may be performed by the crop analysis system 110 onboard the agricultural vehicle 160 and remote system 150 may perform image analysis. The leaf-to-stem ratio determination may be performed by either the crop analysis system 110 or the remote system 150.

According to an aspect, the imaging device 130 can acquire one or more images or one or more crops. For example, imaging device 130 may be a high-speed camera configured to acquire a set of images of crops. The images may be acquired while the agricultural vehicle 160 traverses a field. For instance, while a crop is being harvested (e.g. cut) and/or arranged in windrows, imaging device 130 may acquire image data of the crop.

The crop analysis system 110 and/or the remote system 150 may pre-process the image data in anticipation of further imaging processing to calculate a leaf-to-stem ratio. For example, the image data may be converted to a binary image (e.g. black and white), or undergo color image enhancement to remove noise and/or increase contrast. Subsequently, a detection technique can be performed on the image data prior to determination of the leaf-to-stem ratio. The detection technique employed, in some examples, may be dependent on the ratio determination method utilized. In one example, edges in the image data may be detected using morphological processing. Following edge detection, leaves and stem may be detected. In some implementation, machine learning may be employed to identify leaves and stems. For instance, a machine learning algorithm may be trained using training data where leaves and stems are marked. After training, the algorithm may be executed with live image data to detect leaves and stems in image data.

In another example, object detection may be employed to detect leaves and stems. For instance, image segmentation is performed on the image data to partition image data into various image objects (e.g. sets of pixels). The image objects, for example, may correspond to individual parts of a crop such as stems or leaves. In general, image segmentation assigns pixels to a particular image object.

After detection of leaves and stems, various techniques can be employed to generate metrics indicative of a count of leaves and a count of stem in the image data. In one technique, the metrics include a pixel area respectively occupied by leaves and stem. In another technique, a sampling utilizing markers provides the respective counts. Using the generated metrics, a leaf-to-stem ratio is determined.

The leaf-to-stem ratio may be communicated to the remote system 150 for output to a user. The ratio may be communicated to facilitate fleet management. The ratio may also be communicated to agricultural machine 140 to configure an operation by the machine 140 based on the ratio. In an example, the ratio can be employed to label bales in accordance with a measured ratio.

The computing device 120, in one example, may analyze the image data to determine a leaf-to-stem ratio associated with the one or more crops. The analysis may be alternatively performed by the remote system 150. For instance, the computing device 120 can collect the image data and communicate the images to the remote system 150 for processing. Still further, the computing device 120 and the remote system 150 can work jointly. The remote system 150, for example, may provide storage, processing, and/or communication support to computing device 120. For instance, the remote system 150 may enable notifications to be communicated to third parties, extend machine learning capabilities to the computing device 120, and/or provide distributed computing resources to facilitate image processing across a plurality of nodes. Accordingly, it is to be appreciated that particular features, steps, or capabilities described in connection with the computing device 120, may be performed by the remote system 150 in the alternative.

Figure 2:
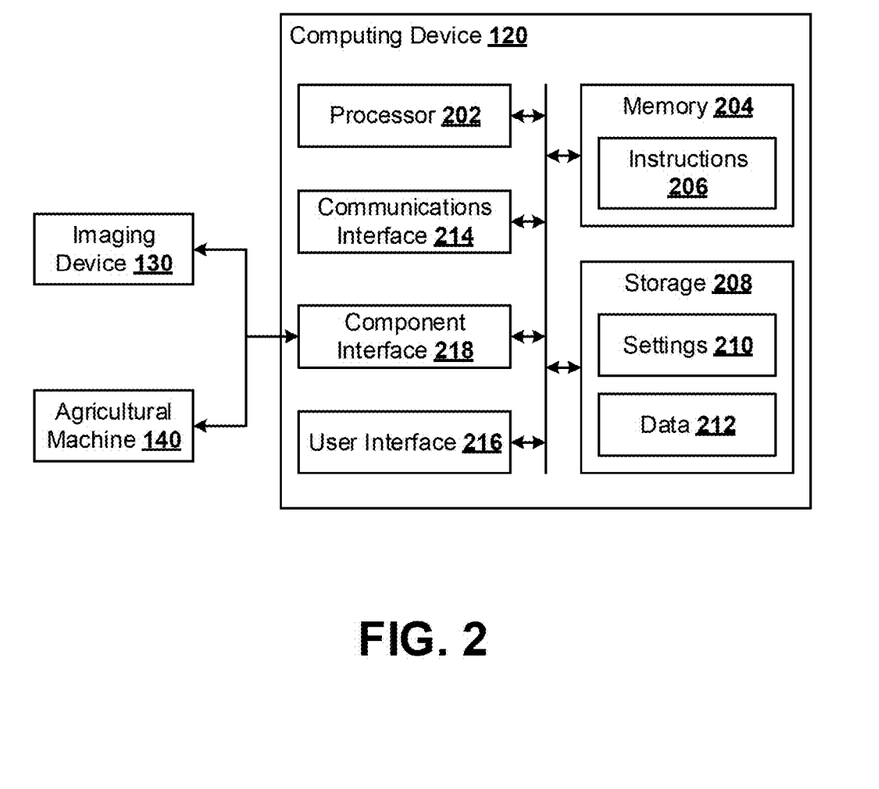
FIG. 2 illustrates an exemplary, non-limiting embodiment of a computing device for the leaf-to-stem measuring system according to various aspects.

Turning to FIG. 2, illustrated is a schematic block diagram of an exemplary, non-limiting embodiment for the computing device 120. Computing device 120 includes a processor 202 configured to execute computer-executable instructions 206 such as instructions composing an image analysis and ratio determination process for the agricultural system 100. Such computer-executable instructions 206 can be stored on one or more computer-readable media including non-transitory, computer-readable storage media such as memory 204. Memory 204 can also include other data (working data or variables) or portions thereof during execution of instructions 206 by processor 202.

The computing device 120 can also include storage 208 that can be, according to an embodiment, non-volatile storage to persistently store instructions 206, settings 210 (e.g. configuration settings) and/or data 212 (e.g., operational data, history data, image data from imaging device 130, learning models etc.).

The computing device 120 may also include a user interface 216 that comprises various elements to obtain user input and to convey user output. For instance, user interface 216 can comprise of a touch display, which operates as both an input device and an output device. In addition, user interface 216 can also include various buttons, switches, keys, etc. by which a user can input information to computing device 120; and other displays, LED indicators, etc. by which other information can be output to the user. Further still, user interface 216 can include input devices such as keyboards, pointing devices, and standalone displays.

The computing device 120 further includes a communications interface 214 to couple computing device 120, via the a communications network, to various devices such as, but not limited to, other computing device 120, remote system 150, agriculture machine 140, agricultural vehicle 160, imaging device 130, other controllers, servers, sensors, or Internet-enabled devices (e.g., IoT sensors or devices). Communication interface 214 can be a wired or wireless interface including, but not limited, a WiFi interface, an Ethernet interface, a Bluetooth interface, a fiber optic interface, a cellular radio interface, a satellite interface, etc.

A component interface 218 is also provided to couple computing device 120 to various components such as imaging device 130 and/or agriculture machine 140. Component interface 218 can include a plurality of electrical connections on a circuit board or internal bus of computing device 120 that is further coupled to processor 202, memory 204, etc. Component interface 218, in another embodiment, can be an interface for a CAN bus of agricultural vehicle 160. Further, the component interface 218 can implement various wired or wireless interfaces such as, but not limited to, a USB interface, a serial interface, a WiFi interface, a short-range RF interface (Bluetooth), an infrared interface, a near-field communication (NFC) interface, etc.

Figure 3:
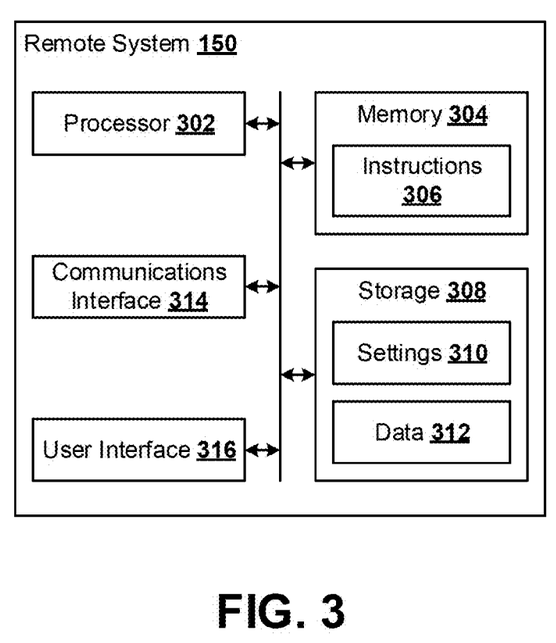
FIG. 3 illustrates an exemplary, non-limiting embodiment of a remote device for the leaf-to-stem system according to various aspects.

Referring now to FIG. 3, illustrated is a schematic block diagram of an exemplary, non-limiting embodiment for the remote system 150. Remote system 150 includes a processor 302 configured to execute computer-executable instructions 306 such as instructions composing an image analysis and ratio determination process for the agricultural system 100. Such computer-executable instructions 306 can be stored on one or more computer-readable media including non-transitory, computer-readable storage media such as memory 304. Memory 304 can also include other data (working data or variables) or portions thereof during execution of instructions 306 by processor 302.

The remote system 150 can also include storage 308 that can be, according to an embodiment, non-volatile storage to persistently store instructions 306, settings 310 (e.g. configuration settings) and/or data 312 (e.g., operational data, history data, image data from imaging device 130, learning models, data from a plurality of systems 100, etc.).

The remote system 150 may also include a user interface 316 that comprises various elements to obtain user input and to convey user output. For instance, user interface 316 can comprise of a touch display, which operates as both an input device and an output device. In addition, user interface 316 can also include various buttons, switches, keys, etc. by which a user can input information to computing device 120; and other displays, LED indicators, etc. by which other information can be output to the user. Further still, user interface 316 can include input devices such as keyboards, pointing devices, and standalone displays.

In another example, remote system 150 may be a cloud-based system such that a conventional user interface may not be physically available to users (but available to system administrators for example). Accordingly, user interaction with the remote system 150 may occur via a communications interface 314. The communications interface 314 may couple remote system 150, via the a communications network, to various devices such as, but not limited to, other computing devices 120, agriculture machines 140, agricultural vehicles 160, imaging devices 130, other controllers, servers, sensors, or Internet-enabled devices (e.g., IoT sensors or devices). Communication interface 314 can be a wired or wireless interface including, but not limited, a WiFi interface, an Ethernet interface, a Bluetooth interface, a fiber optic interface, a cellular radio interface, a satellite interface, etc.

Figure 4:
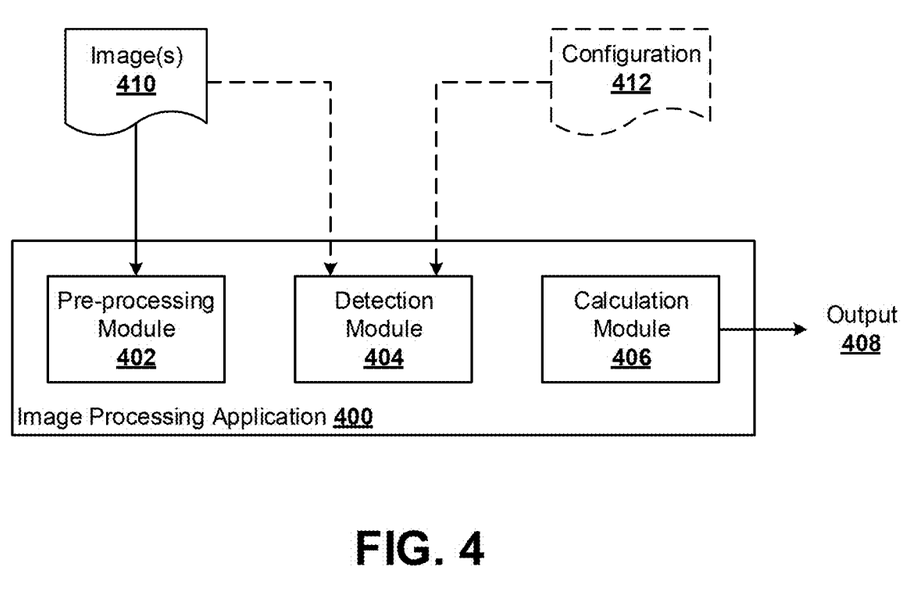
FIG. 4 illustrates an exemplary, non-limiting embodiment of an image processing application in accordance with one or more aspects.

As described above, crop analysis system 110 processes image data to determine a leaf-to-stem ratio of a crop. Referring to FIG. 4, an exemplary, non-limiting embodiment of an image processing application 400 is illustrated. The image processing application 400 may be executed by computing device 120 and/or remote system 150.

According to an embodiment, one or more images 410 are input to image processing application 400 and received by a pre-processing module 402. The pre-processing module 402 perform preliminary image processing to the images 410 to facilitate and/or improve later steps. According to various examples, the pre-processing module 402 can convert images 410 to binary image and/or perform color image enhancement to remove noise and increase contrast. In some examples, pre-processing may be bypassed and images 410 may be input to detection module 404.

Detection module 404, whether operating on pre-processed image data or raw image data, identifies various features in images 410. In particular, detection module 404 identifies portions of images 410 corresponding to leaves and portions of images 410 corresponding to stems. Detection module 404 can employ a variety of techniques. For example, edges in images 410 may be detected using morphological processing. Following edge detection, leaves and stem may be detected via, for example, machine learning. In another example, In another example, detection module 404 can partition pixels into various objects (e.g. leaves and stems).

In an aspect, detection may be crop dependent. Accordingly, detection module 404 may receive configuration information 412 indicative of the crop or other parameters to accurately identify leaves and stems in images 410.

After detection, calculation module 406 can generate a value associated with leaves and a value associated with stems. Using these values, a leaf-to-stem ratio can be determined based on image 410 and output as output 408.

Figure 6:
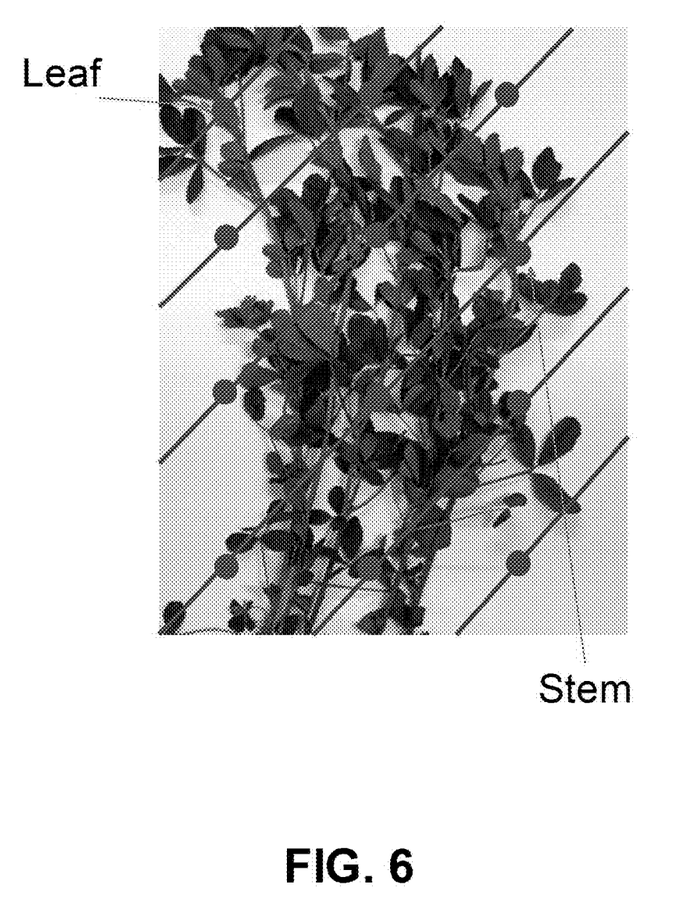
FIG. 6 is an exemplary illustration of a first technique for measuring a leaf-to-stem ratio of a crop.

In one example, one or more lines overlay image 410. The lines may be diagonal. For instance, the lines may have a 45 degree angle with respect to the image. Further, one or more markers are overlaid along the lines. A count of leaves laying underneath any markers and a count of stems laying underneath any markers are determined. Based on the respective counts, a leaf-to-stem ratio is determined (e.g. as the count of leaves divided by the count of stems). FIG. 6 illustrates an example of this technique.

Figure 7:
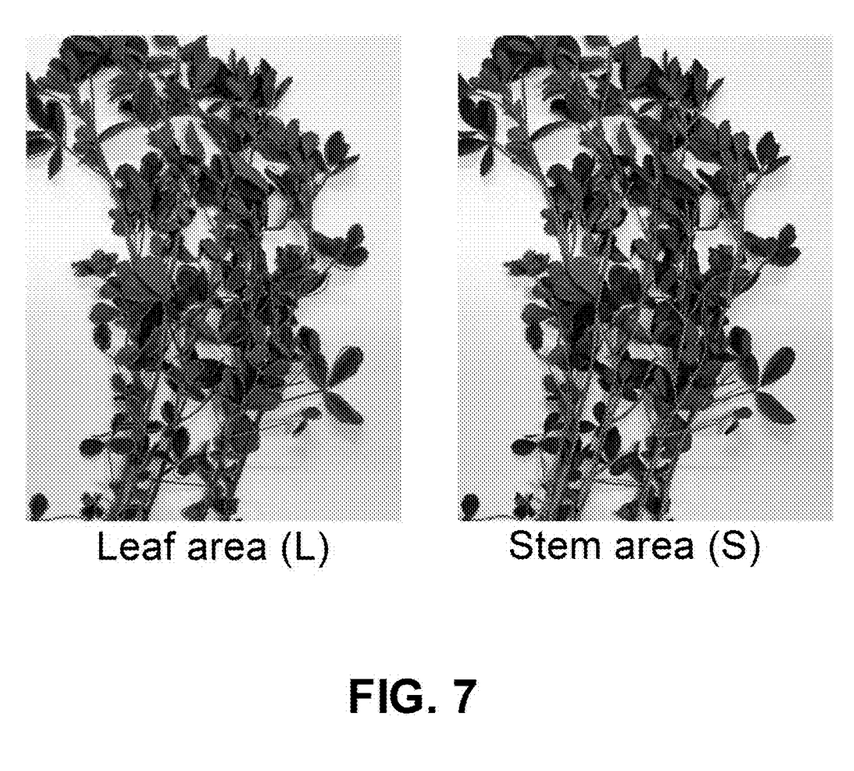
FIG. 7 is an exemplary illustration of a second technique for measuring a leaf-to-stem ratio of a crop.

In another example, after leaves and stems are identified on a pixel-by-pixel basis, a measurement of an area of image 410 occupied by leaves and measurement of an area occupied by stems are generated. The leaf-to-stem ratio is determined based on the area measurements (e.g., leaf area divided by stem area). FIG. 7 illustrates an example of this technique.

Regardless of the determination technique, a leaf-to-stem ratio for an image may be aggregated with measurements associated with other images. For example, an average ratio may be determined from a plurality of images. In an implementation, images may be captured at intervals and respective ratio measurements may be aggregated for each interval. Further, each aggregated measurements may be geo-tagged (e.g. associated with a particular portion of a field). Accordingly, when a crop is baled, for example, the aggregated measurements for each portion may be associated with each bale.

Figure 5:
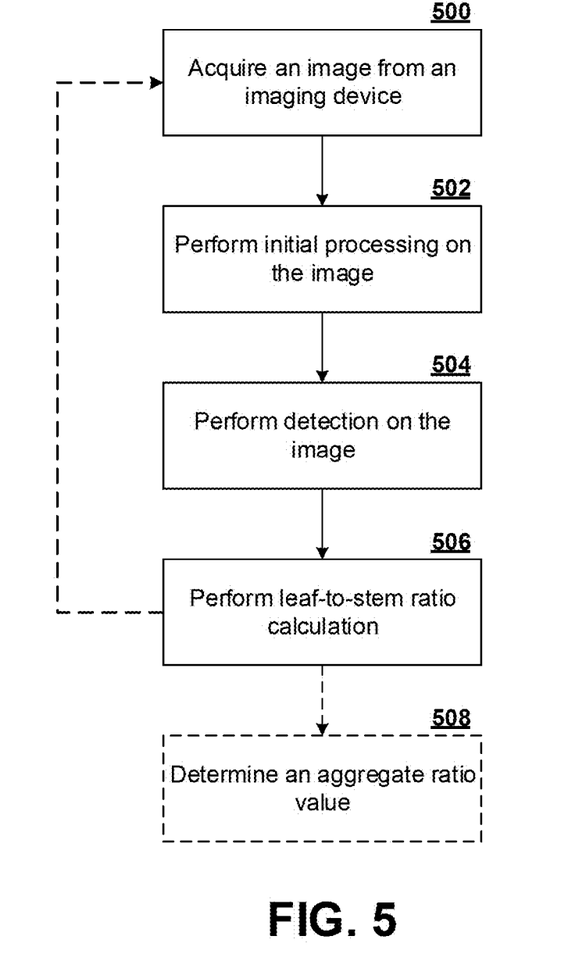
FIG. 5 is a flow diagram of an exemplary, non-limiting embodiment of a method for measuring a leaf-to-stem ratio of a crop according to various aspects.

Referring now to FIG. 5, a method for measuring a leaf-to-stem ratio of a crop is illustrated. The method may be performed by crop analysis system 110 described above. At 500, an image of a crop is acquired by an imaging device. At 502, initial processing is performed on the image. The initial processing may be conversion to a binary image or other color enhancement processing. At 504, detection is performed on the image to identify leaves and stem in the image. The various detection techniques have been previously described. Following detection, at 506, a leaf-to-stem ratio calculation is performed based on the detected features. In one example, steps 500-506 may be repeated for a plurality of iterations and, at 508, an aggregate ratio value is determined based on respective ratios for each iteration.

According to an aspect, a crop analysis system is described. The system includes an imaging device configured to acquire an image of a crop. The system also includes a computing device having a processor executing computer-readable instructions to: generate a first metric associated with an amount of leaf in the image of the crop; generate a second metric associated with an amount of stem in the image of the crop; and determine a leaf-to-stem ratio for the crop based on the first and second metric.

In an example, the computing device is further configured to signal an agricultural machine to perform an action based on the leaf-to-stem ratio. In another example, the system is coupled to an agricultural vehicle and the imaging device is further configured to acquire the image as the agricultural vehicle traverses a field including the crop. In an example, the imaging device is a high-speed camera.

In a further example, the computing device is further configured to identify portions of the image corresponding to leaves and to identify portions of the image corresponding to stems. The computing device may be further configured to identify the portions of the image respectively corresponding to leaves and stem by detecting edges in the image base on morphological processing. The computing device may be further configured to apply a machine learning technique to distinguish leaves and stems following edge detection. In another example, the computing device is further configured to identify the portions of the image respectively corresponding to leaves and stem through image segmentation.

In yet another example, the computing device is further configured to apply a plurality of markers on the image and generate a count of marker overlaying leaves and a count of markers overlaying stems. The computing device is further configured to determine the leaf-to-stem ratio based on the respective counts of markers overlaying leaves and stems.

In another example, the computing device is further configured to apply an image area measurement corresponding to leaves and an image area measurement corresponding to stems. The computing device is further configured to determine the leaf-to-stem ratio based on the respective image area measurements corresponding to leaves and stems.

In an example, the computing device is further configured to acquire a plurality of images via the imaging device and determine an aggregate leaf-to-stem ratio corresponding to the plurality of images.

In another aspect, a crop analysis method is provided. The method includes acquiring an image of a crop with an imaging device. The method also includes segmenting leaves and stems of the crop in the image. The method further includes generating a first metric associated with an amount of leaf in the image of the crop. The method also includes generating a second metric associated with an amount of stem in the image of the crop. In addition, the method may include determining a leaf-to-stem ratio for the crop based on the first and second metric.

In an example of the method, acquiring the image is performed while an agricultural vehicle traverses a field including the crop. In another example, the method may include signaling an agricultural machine to perform an action based on the leaf-to-stem ratio. In a further example, the method includes acquiring a plurality of images via the imaging device and determining an aggregate leaf-to-stem ratio corresponding to the plurality of images.

In another example, the method includes applying a plurality of markers on the image. The first metric is a count of markers overlaying leaves and the second metric is a count of markers overlaying stems. Alternatively, the first metric is an image area measurement corresponding to leaves and the second metric is an image area measurement corresponding to stems.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A crop analysis system, comprising:
    an imaging device coupled to an agricultural vehicle and configured to acquire an image of a crop during harvesting by the agricultural vehicle as the agricultural vehicle traverses a field including the crop, wherein the imaging device is a high-speed camera; and
    a computing device having a processor executing computer-readable instructions to:
        analyze the image of the crop to identify portions of the image corresponding to leaves and identify portions of the image corresponding to stems;
        generate a first metric indicating an amount of leaf in the image of the crop;
        generate a second metric indicating an amount of stem in the image of the crop;
        determine a leaf-to-stem ratio for the crop based on the first and second metric; and
        signal an agricultural machine to perform an action subsequent to harvesting based on the leaf-to-stem ratio, wherein the agricultural machine includes one of a baler.

2. The crop analysis system of claim 1, wherein the computing device is further configured to identify the portions of the image respectively corresponding to leaves and stem by detecting edges in the image base on morphological processing.

3. The crop analysis system of claim 2, wherein the computing device is further configured to apply a machine learning technique to distinguish leaves and stems following edge detection.

4. The crop analysis system of claim 1, wherein the computing device is further configured to identify the portions of the image respectively corresponding to leaves and stem through image segmentation.

5. The crop analysis system of claim 1, wherein the computing device is further configured to apply a plurality of markers on the image and generate a count of marker overlaying leaves and a count of markers overlaying stems.

6. The crop analysis system of claim 5, wherein the computing device is further configured to determine the leaf-to-stem ratio based on the respective counts of markers overlaying leaves and stems.

7. The crop analysis system of claim 1, wherein the computing device is further configured to apply an image area measurement corresponding to leaves and an image area measurement corresponding to stems.

8. The crop analysis system of claim 7, wherein the computing device is further configured to determine the leaf-to-stem ratio based on the respective image area measurements corresponding to leaves and stems.

9. The crop analysis system of claim 1, wherein the computing device is further configured to acquire a plurality of images via the imaging device and determine an aggregate leaf-to-stem ratio corresponding to the plurality of images.

10. A crop analysis method, comprising:
    acquiring an image of a crop during harvesting by an agricultural vehicle with an imaging device coupled to the agricultural vehicle, wherein the imaging device is a high-speed camera and acquiring the image of the crop occurs as the agricultural vehicle traverses a field including the crop;
    analyzing the image of the crop identify portions of the image corresponding to leaves and identify portions of the image corresponding to stems;
    generating a first metric indicating an amount of leaf in the image of the crop;
    generating a second metric indicating an amount of stem in the image of the crop;
    determining a leaf-to-stem ratio for the crop based on the first and second metric; and
    signaling an agricultural machine to perform an action subsequent to harvesting based on the leaf-to-stem ratio, wherein the agricultural machine includes a baler.

11. The crop analysis method of claim 10, wherein analyzing the image of the crop includes applying a plurality of markers on the image.

12. The crop analysis method of claim 11, wherein the first metric is a count of markers overlaying leaves and the second metric is a count of markers overlaying stems.

13. The crop analysis system of claim 10, wherein the first metric is an image area measurement corresponding to leaves and the second metric is an image area measurement corresponding to stems.

14. The crop analysis system of claim 10, further comprising acquiring a plurality of images via the imaging device and determining an aggregate leaf-to-stem ratio corresponding to the plurality of images.

* * * * *